United States Patent [19]

Kubo et al.

[11] Patent Number: 4,873,195
[45] Date of Patent: Oct. 10, 1989

[54] BLOCK-FORMED BASIDIOMYCETE AND A METHOD OF CULTIVATION FOR THE SAME

[75] Inventors: Yoshimasa Kubo; Masao Hondo, both of Suzaka; Masashi Tanaka; Akihiko Asahi, both of Nagano, all of Japan

[73] Assignee: Kabushiki Kaisha Akita, Takayama, Japan

[21] Appl. No.: 195,274

[22] Filed: May 18, 1988

[51] Int. Cl.$^4$ .............................................. C12N 1/14
[52] U.S. Cl. ..................................... 435/254; 435/911
[58] Field of Search ................................. 435/254, 911

[56] References Cited

U.S. PATENT DOCUMENTS

| | | | |
|---|---|---|---|
| 2,851,821 | 9/1958 | Guiochon | 435/254 |
| 2,892,794 | 6/1959 | Insalaco | 430/106 |
| 4,206,064 | 6/1980 | Kiuchi et al. | 430/106 |
| 4,230,787 | 10/1980 | Watanabe et al. | 430/903 X |
| 4,258,116 | 3/1981 | Takasu et al. | 430/903 X |
| 4,645,729 | 2/1987 | Honda et al. | 430/126 |

FOREIGN PATENT DOCUMENTS 4326478 9/1970 Japan .

Primary Examiner—Peter D. Rosenberg
Attorney, Agent, or Firm—Birch, Stewart, Kolasch & Birch

[57] ABSTRACT

The block-formed basidiomycete of the present invention is formed by a block of basidiomycetous spawns, and its upper face which is opposite the side of the root section is a cut face or formed like a surface of cauliflowers or broccolis.

Spawns agglutinate to one another to form a block, preferably, they extend from the root side upward almost in parallel and agglutinate.

The method of cultivating the block-formed basidiomycete comprises following steps:

(a) Filling media in a cultivation bottle;

(b) sterilizing the media;

(c) inoculating seed spawns on the media to cultivate spawns;

(d) removing part of the seed spawns to form a bed after the cultivation;

(e) producing many projected primordia as spawn tissues on the bed by propagating the spawns in a vegetation room after forming the bed; and (f) agglutinating the primorida by plumping them, the primordia being formed by suppressing the production of the fruit bodies under the condition of a shortage of oxygen and a surplus of carbon dioxide gas after producing the primorida.

20 Claims, 6 Drawing Sheets

BLOCK-FORMED BASIDIOMYCETE AND A METHOD OF CULTIVATION FOR THE SAME

BACKGROUND OF THE INVENTION

The present invention relates to a block-formed basidiomycete and a method of cultivation for the same, and more precisely to a block-formed basidiomycete which is formed by plumping primordia produced on a bed, or primodia and stem sections of mushrooms, and by suppressing growth of umbrella-like sections of mushrooms and the method of its cultivation.

Conventionally, artificial cultivation, comprises the following steps:
 filling media which include proper amount of sawdust, rice bran, etc. into such cultivation vessels as widemouthed bottles;
 sterilizing the cultivation vessels by heating;
 inoculating speed-spawns for cultivation;
 germinating fruit-bodies; and
 growing them to mushrooms.

The above stated artificial cultivation procedure is adopted to produce such kinds of mushrooms as Shiitake [*Lentinus edodes* (Berk.) Sing.] (described as Shiitake in the following description), Shirotamogitake [*Lyophyllum ulmarium* (Bull. ex Fr.) Kühner] (described as Shirotamogitake in the following description), Hiratake [*Pleurotus ostreatus* (Jacq. ex Fr.) Quél.] (described as Hiratake in the following description), Enokitake [*Flammalina velutipes* (Curt. ex Fr.) Sing.] (described as Enokitake in the following description), etc. and they are marketed as articles of commerce.

Forms of the mushrooms which are cultivated by the above stated artificial method are, slightly depending on cultivating conditions, almost the same as natural ones. Namely, so-called mushrooms which we eat are the sections called fruit-bodies. The fruit-body normally has a stem section with small diameter and an umbrella like section forming on the stem section.

The fruit-bodies (mushrooms) are small, and are normally served as sliced pieces for cooking materials. Therefore, as a result of such use during cooking the amount of demand for such mushrooms is limited.

Recently, anticancer functions of mushrooms have been discovered, so that it will be very effective for our health to eat much mushrooms without losing their effective ingredients.

The inventor of the present invention has developed the invention by considering if mushrooms may be served as materials for many kinds of cooking, for instance, especially mushrooms may be eaten with knife and fork like a steak.

OBJECTS AND SUMMARY OF THE INVENTION

The object of the present invention is to provide a block-formed basidiomycete which can be applied for such cooking materials that can be eaten with a knife and fork like a steak and so on.

Another object of the present invention is to provide a block-formed basidiomycete having parallel agglutinated spawns, whose osmosis of seasonings is high for flavoring, whose resistance to the teeth is proper, and which can be expected to have such effects of medicine as anticancer, etc. for healthy food.

Moreover, another object of the present invention is to provide an effective method of caltivation for a block-formed basidiomycete whose spawns are agglutinated.

BRIEF DESCRIPTION OF THE DRAWINGS

Embodiments of the present invention will now be described by way of example and with reference to the accompanying drawings in which.

DETAILED DESCRIPTION OF THE PREFERRED EMBDIMENTS

Preferred embodiments of the present invention will be described in detail with reference to the accompanying drawings.

Figure 1:
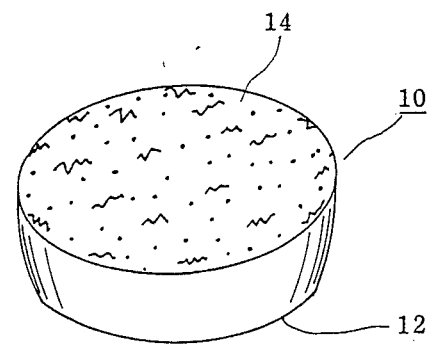
FIG. 1 shows a perspective view of the typical block-formed basidiomycete of the present invention.

FIG. 1 shows a black-formed basidiomycete of the present invention.

A root side of a block-formed basidiomycete 10 is cut and formed a cut face 12 and upper face 14 thereof is formed like a surface of cauliflower or broccoli. In other words, there are formed numberless minute warts or grains like sesami, or there are projected thin rods like corals. These thin rods are produced by extremely suppressing the growth of stem sections and umbrella-like sections of conventional mushrooms or at least the umbrella-like sections thereof, and they do not have the figure of umbrella-like sections at all. And no frill-like spore spending sections, which are normally produced on a rear face of the umbrella-like sections of conventional mushrooms, are observed by at least the naked eyes.

The block-formed basidiomycete of the present invention is formed in a big block by agglutinating stem sections of conventional mushrooms or spawn tissues, which do not develop to be the stem sections, rising from a surface of a medium (described as primodia in the following description) in a growing process.

Figure 2:
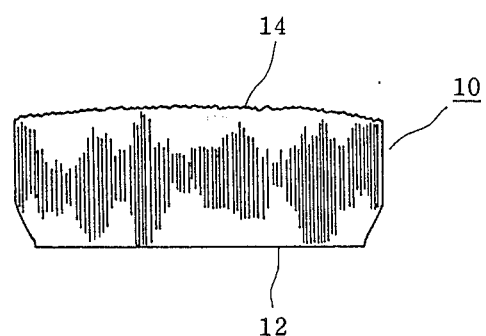
FIG. 2 shows a longitudinal sectional view of FIG. 1.

The block section 10, as shown in a sectional view of FIG. 2, is formed by agglutinating numberless spawns which are extended in parallel from a lower face to an upper face, so its appearance looks like a sectional tissue of a scallop.

When the stem section of the conventional mushroom s sliced, spawn tissues are observed. And the primordium, which is the status at slightly before the germination of the fruit-body by a propagating spawn, and rising from the surface of the spawns is also composed by spawn tissues.

In the present invention, primordia and quite undeveloped stem sections which are germinating as fruit-bodies form a big block by agglutinating spawns suppressing growth of the stem sections and the umbrella-like sections, especially umbrella-like sections under certain conditions described later. In another case, the block is a big grown spawn tissue formed by agglutinating the primordia, and suppressing germination of the fruit-bodies.

The size of the block-formed basidiomycete, depending on growing conditions and growing vessels, etc., will be about 10 cm in diameter and about 3 cm in thickness. The weight will be about 50 g to 80 g. Its color will be white or light gray.

Note that, the kinds of basidiomycetes are not limited but seed spawns of Hiratake, Shirotamogitake, Shiitake, and Enokitake are popularly used.

Forwarding goods, the upper face can be cut to remove the thin rods, and the form can a be forwarding form whose upper face is also a cut face.

The appearance of the invention can be a variety of forms such as a column shown in FIG. 1 and a polygonal pillar in the growing process described later.

The block-formed basidiomycete 10 of the present invention forms like a big block, and its spawns form approximately parallel one another in the bottom-to-top direction like a section of a scallop, so that it can be eaten with knife and fork like a steak and can be flavored well because of high osmosis of seasonings. It also has specific resistance to the teeth, so it can be eaten deliciously with proper flavoring. It will also be a healthy food and expected such effects of medicine as anticancer, etc.

Result of a response test will be described hereinbelow.

The block-formed basidiomycete of Hiratake, which is grown by a method described later, was sliced in parallel to the cut face, roasted with butter, and arranged on a plate with an independently roasted beef steak and vegetable salad. The taste test was executed with 50 men who ate with a knife and fork. Note that, comparison sample was a conventional Hiratake having a thin stem section and a large umbrella-like section, and which was sliced in a longitudinal direction, roasted with butter, and arranged on a plate with independently roasted beef steak and vegetable salad.

|  | Having good resistance to the teeth | Having good flavor | Having good color | Being accustomed to knife & fork |
| --- | --- | --- | --- | --- |
| The block-formed basidiomycete of the present invention | 50 | 40 | 30 | 50 |
| Compared sample Hiratake | 0 | 10 | 20 | 0 |

Next, one of the methods of cultivation of the block-formed basidiomycete will be described.

The method of cultivation belongs to the class of artificial bottle cultivation. Bottles used are wide-mouthed glass or plastic bottles, etc. (preferably calibers 65 mm–75 mm).

Media (e.g. solid compost or substratum) are composed of sawdusts and rice brans: their capacity ratio is 10 to 1–2. Moreover, water is mixed (about 63 weight %) and well agitated to adjust the media. Note that, such nutritive elements such as bagasse, soybean meal, vitamines, minerals, etc. are acceptable to add, and such grains as unpolished rice, wheat, corn, fox-tail millet, barnyard millet, etc. are usable instead of the sawdusts and rice brans.

Figure 3:
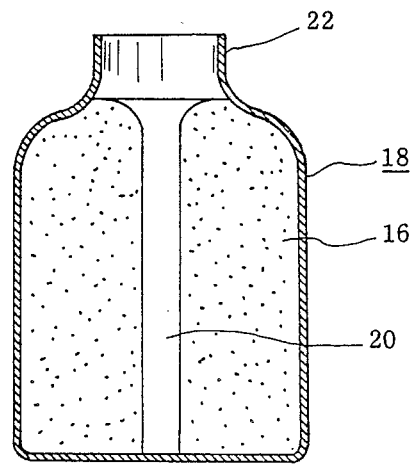
FIG. 3 shows a sectional view of a status of filling a medium into a cultivation bottle and being bored a hole for inoculating and circulating air.
Figure 4:
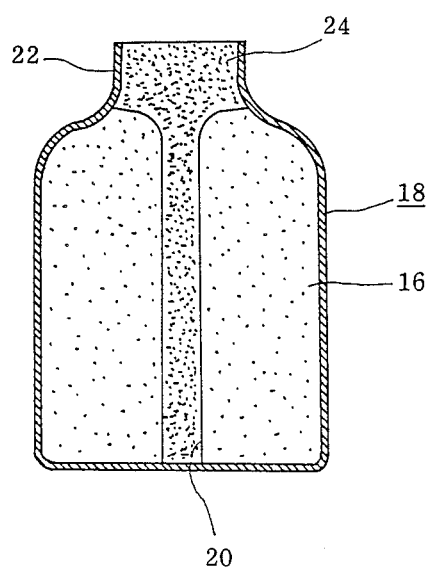
FIG. 4 shows a sectional view of the status of inoculating seed-spawns on the medium.

After adjusting the medium, the medium is filled in a cultivation bottle 18 as shown in FIG. 3, and a hole 20 for inoculating and circulating air is bored in the center of the medium by proper rod-like equipment (not shown). The amount of the medium 16 in the cultivation bottle 18 may be about 670 g for the cultivation bottle 18 having 67 mm in caliber and 1000 cc in capacity.

Note that, the medium 16 is filled until below the neck section 22 of the cultivation bottle 18, and the upper part of the medium is more tightly packed than the lower part thereof. Next, a cap (not shown) is fit on the mouth seciton of the cultivation bottle 18 then the bottle 18 is put into a proper sterilizing caldron (not shown) for steam sterilization.

After sterilization, the cultivation bottle 18 is taken out from the caldron and cooled. The cap is once removed, and seed spawns 24 are inoculated in the neck section 22. The cultivation bottles 18 is accomodated in a cultivation room (not shown) to cultivate spawns after fitting the cap again.

The speed spawns 24 are superior ones which have been cultivated in another medium, and which are made by shattering the medium after propagating the spawns. In conventional artificial cultivation of mushrooms, the amount of inoculating speed spawns was only about 10 g; seed spawns 24 inoculating in the medium will be about 30 g in the present embodiment. The neck section 22 of the cultivation bottle 18 is almost filled with the speed spawns 24. The speed spawns 24 are pressed by rod-like equipment (not shown) to increase their density.

Temperature and humidity of the cultivation room are, for example, depending on the kinds of spawns, should at a be temperature of about 20° C. and humidity of about 75%–80% for Hiratake.

The cultivation period for Hiratake is about for 25 days.

Completing the period, spawns are highly and whitely propagated in the medium.

Figure 5:
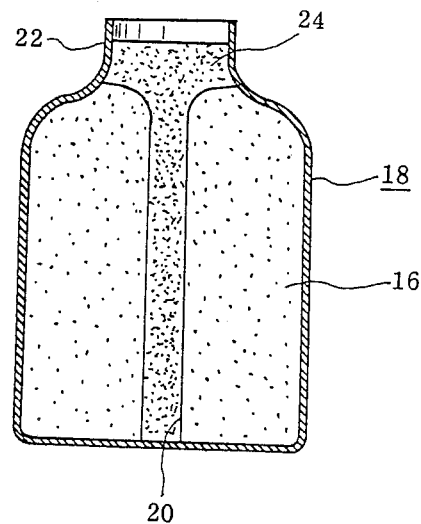
FIG. 5 shows a sectional view of a status of removing part

After cultivation, a part of the spawns are removed to locate the bed in the neck section 22, 2 mm–5 mm below the mouth section of the bottle (see FIG. 5). Next, the cultivation bottle 18 is moved to a vegitation room (not shown). The vegetation room is preferably kept dark and has a ventilator and adjusting equipment for temperature and humidity.

In an initial period in the vegetation room, ventilation should be fully executed. Namely, fresh air is much introduced to proliferate spawns more. After that, the spawns on the surface of the medium rise to produce the primordium 28 composing of spawn tissue. After a while, small fruit-bodies are germinated after producing the primordium 28.

Figure 6:
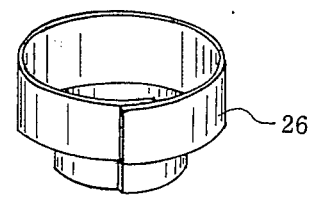
FIG. 6 shows a perspective view of a forming cylinder.
Figure 7:
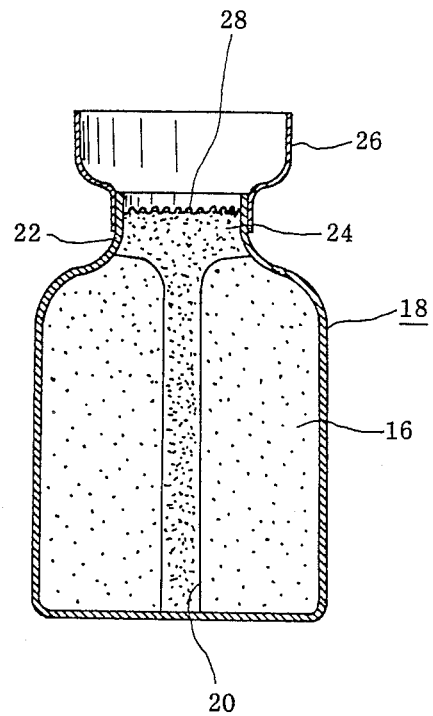
FIG. 7 shows a partial sectional view of a status of producing primordia on a bed.
Figure 8:
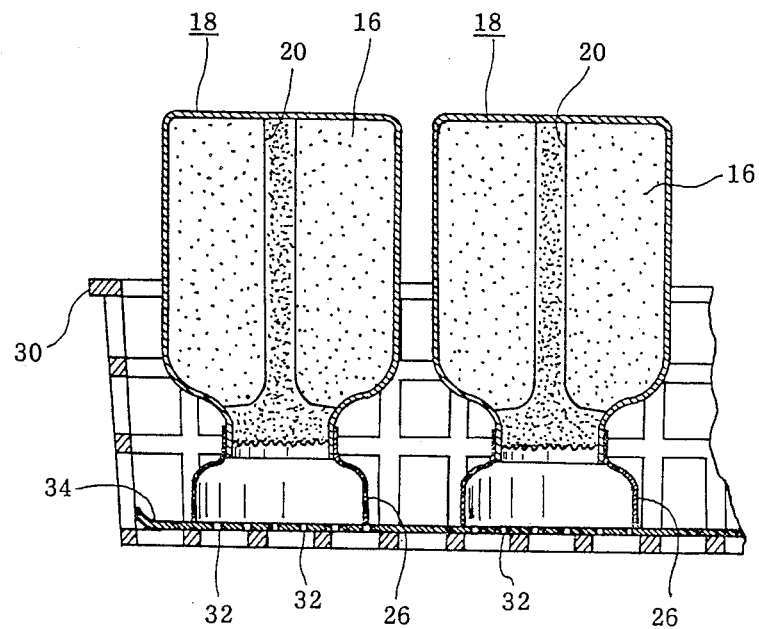
FIG. 8 shows a sectional view of a status of keeping the cultivation bottle upside-down in a container.

After producing the primordium 28 or upon germinating small fruit-bodies, a forming cylinder 26 whose upper part has larger diameter is fixed at the mouth section of the bottle (see FIG. 7). The forming cylinder 26 is formed by comparatively soft and elastic plastic plate, whose end sections are piled each other as shown in FIG. 6 and the piled sections can be opened by unfolding against its elasticity. Upon fitting the forming cylinder 26 at the mouth section of the cultivation bottle 18, the circumference of the vegetation room s changed to a condition of a shortage of oxygen and of surplus of carbon dioxide gas to suppress the growth of spawns. To change the circumference of the above stated condition, the carbon dioxide gas is actively introduced into the vegetation room to maintain the consistency of the carbon dioxide gas, e.g. about 5000 ppm. In this condition, the spawns produce carbon dioxide gas by their own breathing, so that the condition of the inside of the vegetation room becomes a shortage of oxygen and surplus of carbon dioxide gas, and the spawns are suppressed in their growth. In the case of no oxygen, of course, spawns will be die so proper ventilation should be required.

Note that, the inventors of the present invention put the cultivation bottles 18 upside-down in the vegetation room instead of introducing carbon dioxide gas actively. A plurality of the cultivation bottles 18 are put in a container 30, e.g. 16 bottles a container, and accomodated in the vegetation room. The cultivation bottles 18 are put upside-down in the container 30. There is laid a plastic film 34 having a plurality of small holes 32 on the inner bottom face of the container 30, and the cultivation bottles 18 are put upside-down on the plastic film 34. Namely, the opened mouth section of the forming cylinder 26 can come in contact with the upper face of the plastic film 34. In this case, it is proper to support mid sections of the cultivation bottles 18 put upside-down in the container 30 by a bored plate, etc. to prevent falling down.

After putting the cultivation bottle 18 upside-down, the forming cylinder 26 is closed by the plastic film 34 so air circulating to the vegetation room leaves only via the small holes 32 of the plastic film 34 and the holes of the container 30. Therefore, air circulation to the inner part of the forming cylinder 26 is small amount. In the forming cylinder 26, carbon dioxide gas is exhausted by breathing of spawns, so that the condition is a surplus of carbon dioxide gas, then the carbon dioxide gas from the spawns and the inner air from the small holes 32 are gradually balanced to maintain the condition: shortage of oxygen and surplus of carbon dioxide gas.

Conveniently, the inner space of the forming cylinder 26 only is maintained in the above condition naturally, and the vegetation room can have normal ventilation without specific control. The primordia, or the primordia and the fruit-bodies attempt to extend to oxygen rich entrance of the forming cylinder 26. In this case, normal growing action to form fruit-bodies cannot execute, especially the growing action to form the umbrella-like section cannot execute at all because the inside of the vegetation room has been maintained dark and the inner space of the forming cylinder 26 has also been maintained in the condition of a shortage of oxygen and surplus of carbon dioxide gas, so that spawns of primordia grow and adjacent primordia become gradually thick and approach to one another. Finally, the spawns are agglutinated with one another and expand to fill the inner space of the forming cylinder 26.

According to above stated process, the block-formed basidiomycete is formed. The appearance thereof is determined by the shape of inner space of the forming cylinder 26.

The vegetation period depends on the type of spawns, it was for 15 days after producing the primordia in the case of Hiratake. The vegetation conditions are that the temperature in the vegetation room is maintained at about 15° C. until the 10th day, then is lowered to about 10° C. until harvest time, while humidity therein is maintained about 95% until about the 7th day, and lowered to about 90% between the 8th–10th day, then further lowered to 70% until harvest time.

The reason why we maintained the vegetation room hot and at a high humidity during the initial period for vegetation and then gradually lowered these conditions is to accelerate the growth of the spawns during the initial and middle periods of vegetation for shortening vegetation period, and to increase the density and hardness of the block-formed basidiomycete for preventing decomposition and for long life by rather suppressing the growth of the spawns than growing during the latter period of vegetation.

After the block-formed basidiomycete has expanded to the full size of the inner space of the forming cylinder, the forming cylinder 26 is taken out from the mouth section of the cultivation bottle 18. Then, the block-formed basidiomycete is cut off by a knife along the mouth section.

The upper face of a given block-formed basidiomycete looks like a surface of cauliflower or broccoli, and the upper face thereof can be also cut to make upper and bottom faces cut faces for good appearance as a goods for commerce.

In the above embodiment, the bed face was located 2 mm–5 mm below the mouth section by removing part of the seed spawns 24, but the bed face can be lower, e.g. the upper face of the medium, depending on various cases.

The root side of the block-formed basidiomycete can retain its form by pulling out from the bottle without being a cut face.

Next, the seed spawns to be inoculated in the cultivation bottle 18 after sterilization is described in detail.

The seed spawns used are superior ones which are prior cultivated in the medium as we described above. The seed spawns are formed by shattering the medium completing cultivation therein. In conventional artificial cultivation of mushrooms, seed spawns used are comparatively large ones having a diameter of 5 mm–8 mm. If seed spawns are shatterd too finely, spawns are also cut finely and the vital energy of the spawns are weaken so that a long cultivation period is required and good formed fruit-bodies cannot be gained.

However, the seed spawns are rather shattered finely in the present invention. Namely, the seed spawns whose vital energy is weakened is prefer.

The preferred seed spawns are mixture of 60 weight % of spawns having grain diameter below 2.5 mm and of 40 weight % of spawns having grain diameter at or more than 2.5 mm–below 4.5 mm. Of course, seed spawns are shattered by proper mill so spawns whose grain diameter is more than 4.5 mm is accidentally mixed but preferred their weight persentage is below 10%.

The seed spawns prepared as we described above is filled in the neck section 22 of the cultivation bottle 18 and are pressed to increase density. Clearances among grains can be narrower so water scattering from the medium during cultivation can be prevented because of using seed spawns having small grain diameter and by being pressed at inoculating. After cultivation, part of the spawns are removed to locate a bed at the neck section 22, 2 mm–5 mm below the mouth section of the bottle. After removing a part of the spawns, cultivation bottles 18 are moved to the inside of the vegetation room and an increased amount of oxygen is provided therein for active propagation of the spawns to produce primordia 28. An important point of this step is that spawns have once shattered finely, so the spawns grow from the whole face of the bed to upward uniformly and agglutinate one another when spawns cover the bed where the removing part of spawn has been completed. At that time, the part of the spawn groups projecting on the surface like grain is the primordium 28 composed of spawn tissues.

After producing the primordia by growing spawns to upward from the whole surface of the bed, maintaining the inside of the vegetation room with a shortage of oxygen and a surplus of carbon dioxide gas as we described above, the spawns grow straight and parallel without getting entangled with one another because of their weak vital energy.

If seed spawns have a large size, the vital energy of spawns are strong so spawns grow in the direction to bridge one another, so that the spawns of the block-formed basidiomycete get entangled with one another.

In the status of getting entangled, the resistance to the teeth will be worse and a good flavor cannot be gained.

The spawns are extended almost parallel as we described above, the flavor tastes like high-grade beef.

Figure 9:
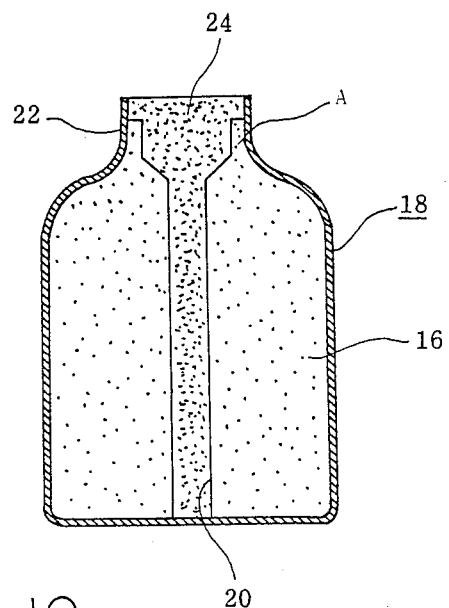
FIG. 9 shows a partial sectional view of a status of being bored a hole, whose upper section has large diameter, for inoculating and circulating air.
Figure 10:
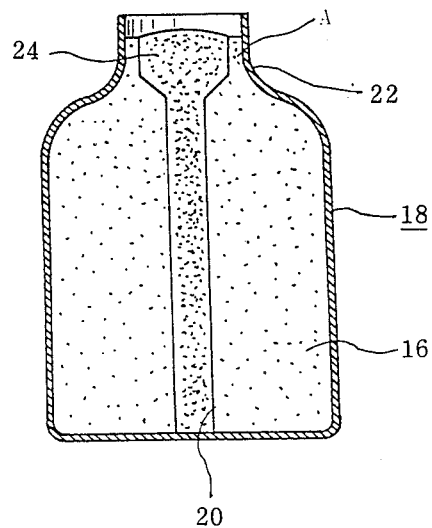
FIG. 10 shows a partial sectional view of a status of rising center of the bed like a mountain and of exposing an upper fringe section of a medium.

Another embodiment for preparing the medium is shown in FIG. 9.

In this embodiment, the upper section of the hole 20 for inoculating and circulating air bored in the medium 16 is formed to have larger diameter. And the upper face of the medium A which rounds the larger-diameter section of the hole 20 is adjusted to locate midway of the neck section 22, and the level of the inner bottom face of the larger-diameter section of the hole coincide with the surface of the medium 16 of FIG. 3. The parts of the medium corresponding to the bottom part of the larger-diameter section of the hole 20 and the shoulder part of the cultivation bottle are packed tighter than other parts.

In this embodiment, too, the seed spawns 24 are filled about 30 g to be full of the neck section 22 and are pressed with proper pressure.

It is preferred to remove part of the spawns after cultivation to form the bed slightly rising at its center and at its fringe section exposing a part of the medium A.

Normally, air circulates via the clearance between the inner wall face of the cultivation bottle 18 and the outer wall face of the medium 16 which is formed by shrinking capacity of the medium 16. Therefore, the function of the spawn in the fringe section of the bed is more active than center thereof, so that the block-formed basidiomycete gained may be formed with its upper center indented.

However, as we described above, the medium of the shoulder section of the cultivation bottle is tightly packed, so that it is uneasy to be come the inner wall face of the neck section 22 off the outer wall face of the medium corresponding. Even if air circulation is active by coming off, the part of the medium A is exposed and the spawns are shattered by removing part of spawns so the vital energy of the spawns are weak and growth rate thereof will be low. Therefore, a superior block-formed basidiomycete whose upper center is slightly raised can be gained.

Note that, the part of the medium A is packed comparatively soft so that it easily becomes accustomed to the seed spawns 24, and properly condensed when the seed spawns 24 is properly pressed.

The contact area between the seed spawns 24 and the medium 16 is large because the seed spawns 24 are filled in the hole 20 whose upper part is formed in a larger-diameter section as we described above.

When the spawns grow from the surface of the bed, the oxygen amount of the surface of the bed is larger than inside of the medium thereof in spite of a shortage of oxygen, so that growing degree of the spawns in the seed spawns 24 is higher than ones in the medium 16. The difference between the growing degree make the bottom face of the seed spawns 24 come off the medium in the vicinity of the border of the two, the seed spawns are lifted by the growing force of the spawns to grow from the surface of the bed, and sometimes there is formed a cavity between the bottom face of the seed spawns and the medium. If there is a such cavity, the medium adheres to the cut face when the block-formed basidiomycete is cut along the mouth section of the cultivation bottle 18, so that the appearance of the block looks poor.

However, the contact area between the seed spawns 24 and the medium 16 is large as we described above, the number of the spawns connecting the two is large so there is an advantage that no coming off between the two occurs.

Figure 11:
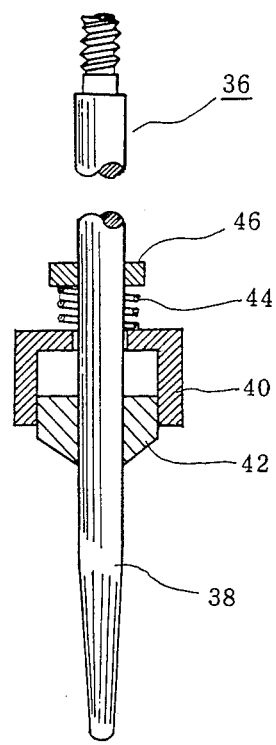
FIG. 11 shows a sectional view of a kind of boring jigs for boring the hole for inoculating and circulating air.

FIG. 11 shows a boring jig for boring the hole 20 whose upper part is a larger-diameter section shown in FIG. 9 in the medium 16.

The boring jig 36 has a fringe presser 40 whose shape is like a bottomed shallow cylinder for forming the part of the medium A by pressing the upper fringe section of the medium, and which is provided at proper position of the rod 38, and a center presser 42 whose lower section is formed as an inverted coned-trapezoid for pressing the upper center of the medium, and which is fixed below the fringe presser 40.

The fringe presser 40 is movably provided on the rod 38 and connected to a fixed piece 46 which is fixed on the rod 38 by a spring 44 whose both ends are fixed at the fringe presser 40 and the fixed piece 46.

Therefore, the prescribed shaped hole 20 can be bored by setting the boring jig 36 in the medium 16. At that time, the part of the medium A packed comparatively softer than others by retracting the fringe presser 40 with the spring 44.

While, the medium corresponding to the shoulder section of the cultivation bottle is packed outward, too, by a tapered face of the center presser 42 so it is packed tighter than others.

Not only the center presser 42 but the fixed piece 46 are movable on the rod 38 so the shape of the hole 20 can be changed by changing positions of them.

Note that, if the bottom face and the surrounding face of the center presser 42 are formed of uneven faces, the inner face of the larger-diameter section of the hole 20 is also formed uneven so that the contact area between the seed spawns 24 and the medium 16 will be preferably larger.

We have described preferred embodiments in detail but the present invention is not limited the preferred embodiments so many modifications, of course, can be acceptable without deviation from the sprit of the invention.

A specific example of the method of cultivation of the Hiratake block-formed basidiomycete will be described below.

(Cultivation example)

The medium whose main elements are sawdust and rice brans was adjusted to a water content of about 63%.

About 670 g of the medium was filled in the plastic wide-mouthed cultivation bottle having a caliber of 67 mm and a capacity of 1000 cc. A hole for inoculating and air circulation was bored in the medium as shown in FIG. 1.

Next, the cultivation bottle was fitted with a cap and was put in the sterilizing caldron for steam sterilization.

After cooling, the cap was taken off, about 30 g of Hiratake spawns were inoculated, and softly pressed. The seed spawns were priority cultivated, and the spawns and the medium were shattered together to be in a grain form. Grains whose diameter about 2.5 mm were the largest in number and grains whose diameter more than 4.5 mm were removed.

After inoculating, the cultivation bottles were accommodated in the cultivation room where the temperature was 19° C.-21° C. and humidity was 75%-80%. About 25 days passed, white spawns propagated in the whole medium.

Next, the bed face was formed about 3 mm below the mouth section of the bottle by removing part of the seed spawns with a removing blade. The cultivation bottle was accomodated in the vegetation room and the temperature was maintained at about 15° C. and the humidity nearly 100% therein, and a rich oxygen condition was maintained by good ventilation and then the spawns were further propagated to cover the bed, and the primordia were produced about the 10th day.

Next, a forming cylinder shown in FIG. 6 was fixed at the mouth section of the cultivation bottle immediately, and it was placed upside down in the net-basket where a plastic film boring having many small holes was laid on the bottom. The humidity in the vegetation room was decreased to about 95%. The inner space of the forming cylinder is connected to the vegetation room only by holes of the container and the small holes of the plastic film, so that it was under a condition of a shortage of oxygen and surplus of carbon dioxide gas. Therefore, production of the fruit-bodies was suppressed and the primordia grew and agglutinated with one another, and expanded in the full of the inner space of the forming cylinder to form a block-formed basidiomycete.

At harvest time, the forming cylinder was removed from the mouth section, and the block was cut along the mouth section by knife, so that the root side of the block was a cut face and the upper face was formed like a surface of cauliflower or broccoli. The mean amount of harvest was 75 g a bottle.

Note that, the temperature in the vegetation room was gradually lowered to about 10° C. and the humidity was adjusted to about 75% at harvest time.

When small fruit-bodies were produced with the primordia, the spawns were grown by putting the cultivation bottle with the forming cylinder upside-down, so that the block-formed basidiomycete agglutinating stem sections and spawns of the primordia like a block was formed, and whose growth of the umbrella-like sections of conventional Hiratake was quitely suppressed.

Furthermore, the hole for inoculating and air circulation was formed as shown in FIG. 9 in which the upper section was the larger-diameter section, so that the seed spawns and the medium did not come away from each other.

Besides Hiratake, the block-formed basidiomycete was gained by using Shirotamogitake spawns.

What is claimed is:

1. A method of cultivating a block-formed basidiomycete, comprising:
    (a) cultivating seed-spawns of a basidiomycete in a container;
    (b) removing a portion of said seed-spawns from said container to form a bed;
    (c) producing projected primordia as spawn tissues on said bed by propagating said spawns in a dark cultivation room; and
    (d) agglutinating said primordia by plumping said primordia, the primordia being formed by suppressing the production of fruit bodies of a basidiomycete under atmospheric conditions of a relative shortage of oxygen and an excess of carbon dioxide gas.

2. The method of cultivating a block-formed basidiomycete according to claim 1 further comprising the steps of:
    (a) filling media selected from the group consisting of sawdust and grain into a cultivation bottle;
    (b) sterilizing said media prior to cultivation.

3. The method of cultivating a block-formed basidiomycete according to claim 2, wherein the grain is rice brand.

4. A block-formed basidiomycete having an upper surface, comprising:
    a block of primordia formed prior to the germination of fruit-bodies of a basidiomycete, said block of primordia formed by agglutinating basidiomycete spawns positioned approximately in parallel; and
    minute projections formed by a degenerated section of fruit bodies on said upper surface of said block-formed basidiomycete.

5. A foodstuff comprising the block-formed basidionycete of claim 4.

6. A block-formed basidiomycete having an upper surface, comprising:
    a block of primordia and fruit-bodies of a basidiomycete wherein the fruit-bodies germinate on the primordia, said block of primordia and fruit-bodies formed by agglutinating basidiomycete spawns and a stem section of said fruit-bodies positioned approximately in parallel; and
    minute projections formed by a degenerated section of fruit bodies on said upper surface of said block-formed basidiomycete.

7. A foodstuff comprising the block-formed basidiomycete of claim 6.

8. The block-formed basidiomycete of claim 4, which is about 10 cm in diameter, about 3 cm in thickness and about 50 g to 80 g in weight.

9. The block-formed basidiomycete of claim 4, wherein the basidiomycete spawns are selected from the group consisting of Hiratake, Shirotamogitake, Shiitake and Enokitake.

10. The method of cultivating a block-formed basidiomycete according to claim 2, further comprising the step of boring a hole for inoculating and circulating air in said media.

11. The method of cultivating a block-formed basidiomycete according to claim 2, wherein said cultivation bottle is a widemouthed bottle.

12. The method of cultivating a block-formed basidiomycete according to claim 10, wherein the upper section of said hole for inoculating and circulating air bored in said media is larger than the lower section thereof in diameter, and said media around the larger-diameter section is filled comparatively softer than other sections and its upper face is located at the midway of the neck section of said cultivation bottle.

13. The method of cultivating a block-formed basidiomycete according to claim 1, wherein said seed spawns are previously cultivated in media and shattered, and whose grain diameters are below 4.5 mm.

14. The method of cultivating a block-formed basidiomycete according to claim 2, wherein removing part of said seed pawns exposes the surface of said medium.

15. The method of cultivating a block-formed basidiomycete according to claim 11, wherein a forming cylinder whose diameter of upper section is larger than the diameter of the mouth section of said widemouthed cultivation bottle is fixed at the mouth section in the step of plumping said primordia to grow said a spawns in said forming cylinder for forming spawn block following the inner face of said forming cylinder.

16. The method of cultivating a block-formed basidiomycete according to claim 15, wherein said forming cylinder is taken off from the mouth section after plumping said spawn block following the inner face of said forming cylinder, and said spawn block is cut along the mouth section to form a root side and a cut face for a harvest.

17. The method of cultivating a block-formed basidiomycete according to claim 15, wherein removing part of said seed spawns locates the surface of said bed 2 mm–5 mm below the mouth section.

18. The method of cultivating a block-formed basidiomycete according to claim 9, wherein removing part of said seed spawns forms the center of said bed slightly higher than the fringe section thereof and exposes the surface of said media whose fringe section is packed softer.

19. The method of cultivating a block-formed basidiomycete according to claim 12, wherein said cultivation bottle is positioned upside-down on a support which has small holes to reduce air circulation to said forming cylinder by the small hols for making the inner space of said forming cylinder in a condition of a shortage of oxygen and surplus of carbon dioxide gas in the step of plumping said primordia.

20. The method of cultivating a block-formed basidiomycete according to claim 1, wherein the temperature and the humidity are maintained high for growing said spawns in the initial period of plumping said primordia, and the temperature and the humidity are maintained low for reducing water content of said spawns to increase hardness in a latter period.

* * * * *